US012734946B2

(12) United States Patent
Matsukawa et al.

(10) Patent No.: US 12,734,946 B2
(45) Date of Patent: Sep. 15, 2026

(54) HEADREST FOR VEHICULAR SEAT AND PRODUCTION METHOD THEREFOR

(71) Applicant: DELTA KOGYO CO., LTD., Hiroshima (JP)

(72) Inventors: Ryoji Matsukawa, Hiroshima (JP); Go Iwamoto, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 187 days.

(21) Appl. No.: 18/568,123

(22) PCT Filed: Jun. 20, 2022

(86) PCT No.: PCT/JP2022/024490
§ 371 (c)(1),
(2) Date: Dec. 7, 2023

(87) PCT Pub. No.: WO2023/286528
PCT Pub. Date: Jan. 19, 2023

(65) Prior Publication Data
US 2024/0270138 A1 Aug. 15, 2024

(30) Foreign Application Priority Data
Jul. 16, 2021 (JP) ................................ 2021-117977

(51) Int. Cl.
*B60N 2/80* (2018.01)
*B29C 39/10* (2006.01)
*B29L 31/30* (2006.01)

(52) U.S. Cl.
CPC ................ *B60N 2/80* (2018.02); *B29C 39/10* (2013.01); *B29L 2031/3023* (2013.01)

(58) Field of Classification Search
CPC .... B60N 2/80; B29C 39/10; B29L 2031/3023
See application file for complete search history.

(56) References Cited

U.S. PATENT DOCUMENTS 5,855,831 A * 1/1999 Takei .................... B29C 44/581 264/46.7
5,927,814 A * 7/1999 Yoshimura ............... B60N 2/80 297/391
(Continued)

FOREIGN PATENT DOCUMENTS

CN 110039703 A 7/2019
JP S56-089213 A 7/1981
(Continued)

OTHER PUBLICATIONS

International Search Report issued in PCT/JP2022/024490; mailed Jul. 26, 2022.
(Continued)

*Primary Examiner* — Philip F Gabler
(74) *Attorney, Agent, or Firm* — Studebaker Brackett PLLC

(57) ABSTRACT

A headrest includes a frame, a tension member, a cover, and a pad. The frame includes a pair of main frame parts spaced apart from each other in a first direction and extending in a second direction intersecting the first direction. The tension member includes a tension part extending between the pair of main frame parts. The cover defines a bag and accommodating the pair of main frame parts and the tension member in the bag. The pad encloses the pair of main frame parts and the tension member, the pad being made of a material which has had fluidity and been injected in the bag through a specific portion of the cover that is away from the tension part and faces the tension part in a third direction intersecting the first direction and the second direction.

9 Claims, 9 Drawing Sheets

(56) References Cited

U.S. PATENT DOCUMENTS

| | | | | |
|---|---|---|---|---|
| 7,338,129 | B2 * | 3/2008 | Tabata | B60N 2/80 297/391 |
| 9,616,788 | B2 * | 4/2017 | Tabata | A47C 7/38 |
| 9,746,048 | B2 | 8/2017 | Okubo | |
| 10,821,636 | B2 * | 11/2020 | Tabata | B60N 2/58 |
| 2008/0100116 | A1 * | 5/2008 | Orzelski | B60N 2/80 297/391 |
| 2015/0159721 | A1 | 6/2015 | Okubo | |
| 2017/0225597 | A1 * | 8/2017 | Okubo | B60N 2/68 |
| 2018/0178695 | A1 | 6/2018 | Okubo | |
| 2018/0250857 | A1 * | 9/2018 | Dry | B29C 45/2606 |
| 2018/0290350 | A1 | 10/2018 | Tabata et al. | |
| 2019/0084460 | A1 | 3/2019 | Okubo | |
| 2019/0217762 | A1 | 7/2019 | Tabata | |
| 2019/0299828 | A1 | 10/2019 | Okubo | |

FOREIGN PATENT DOCUMENTS

| | | | |
|---|---|---|---|
| JP | 3451562 | B2 | 9/2003 |
| JP | 6431812 | B2 | 11/2018 |
| JP | 6660948 | B2 | 3/2020 |
| JP | 6796001 | B2 | 12/2020 |
| KR | 2003-0061990 | A | 7/2003 |

OTHER PUBLICATIONS

The extended European search report issued by the European Patent Office on Sep. 25, 2024, which corresponds to European Patent Application No. 22841872.9-1009 and is related to U.S. Appl. No. 18/568,123.

Office Action issued in CN 202280036288.0; mailed by the China National Intellectual Property Administration on Mar. 10, 2026.

* cited by examiner

HEADREST FOR VEHICULAR SEAT AND PRODUCTION METHOD THEREFOR

TECHNICAL FIELD

The present invention relates to a headrest for a vehicle seat and a method for manufacturing the headrest.

BACKGROUND ART

A vehicle seat has an upper portion to which a headrest is attached to protect the neck and the head of a sitting person. The headrest includes: a frame formed of a bent metal pipe; a pad enclosing the frame; and a cover covering a surface of the pad.

Here, a foam in place method may be used in manufacturing the headrest. The foam in place method is a method for manufacturing a headrest by setting, in a mold, a cover defining a bag and a part of a frame, and injecting a pad forming material into the bag. Use of the foam in place method to manufacture the headrest may cause a problem that the material having been injected into the bag hits a forward portion of the cover in an injection direction under a highly kept pressure, and thus the material is excessively dense in the portion. The portion densely containing the pad forming material would be harder than another portion of the cover and a hard spot may occur, which may lead to a poor quality.

Each of Patent Literatures 1 to 4 discloses a configuration including a mesh member in a bag defined by a cover to solve the problem. The technology disclosed in each of Patent Literatures 1 and 2 adopts a configuration including a mesh member in the shape of a strip in the cover around a portion near to a material injection hole formed in the bag for injection of the pad forming material. The technology disclosed in each of Patent Literatures 1 and 2 includes, for the injection of the pad forming material in the manufacturing, arranging an intermediate member before forming the pad so that the material injection hole faces vertically upward, inserting a nozzle from above to reach the inside of the bag through the material injection hole, and injecting the material thereinto.

Besides, the technology disclosed in each of Patent Literatures 3 and 4 adopts a configuration including a mesh member in the shape of a bag in such a manner as to enclose a discharge hole of a nozzle inserted in a bag defined by a cover. The technology disclosed in each of Patent Literatures 3 and 4 includes, for the injection of the pad forming material in the manufacturing, arranging an intermediate member before forming the pad so that the material injection hole faces in a lateral direction (substantially horizontal direction), inserting the nozzle in the lateral direction to reach the inside of the bag through the material injection hole, and injecting the material thereinto.

Each of Patent Literatures 1 to 4 discloses that the mesh member in the shape of the strip or bag allows the material having flowed out of the injection nozzle to pass therethrough, thereby decreasing an injection pressure and enabling suppression of an excessively high density of the material in a part of the cover.

CITATION LIST

Patent Literature

Patent Literature 1: Japanese Patent Publication Number 3451562

Patent Literature 2: Japanese Patent Publication Number 6796001

Patent Literature 3: Japanese Patent Publication Number 6431812

Patent Literature 4: Japanese Patent Publication Number 6660948

SUMMARY OF INVENTION

However, the technology disclosed in each of Patent Literatures 1 to 4 has a possibility of breaking the mesh member in the shape of the strip or detaching the mesh member from the cover having been joined to each other by a distal end of the nozzle at the injection of the pad forming material. Specifically, the technology disclosed in each of Patent Literatures 1 and 2 includes inserting the nozzle into the material injection hole from above. In this regard, the distal end of the nozzle may break the mesh member in the shape of the strip or detach the mesh member from the cover due to insertion of the nozzle at a wrong angle or due to excessively deep insertion of the nozzle.

The technology disclosed in each of Patent Literatures 3 and 4 includes inserting the nozzle into the material injection hole in the lateral direction. In this regard, the mesh member in the shape of the bag is considered to hang down under the weight thereof in the bag at the insertion of the nozzle. At the insertion of the nozzle in this state, the distal end of the nozzle may break the mesh member in the shape of the bag or detach a fixed portion thereof to the cover.

As described above, when the mesh member in the shape of the strip or bag is broken or the fixed portion to the cover is detached from the cover in the insertion of the nozzle, the material from the nozzle may hit a certain portion of the cover without a decrease in the injection pressure and a hard spot may occur.

The present invention has an object of providing a headrest for a vehicle seat and a method for manufacturing the headrest to achieve suppression of an occurrence of a hard spot.

A headrest for a vehicle seat according to one aspect of the present invention includes a frame, a tension member, a cover, and a pad. The frame includes a pair of main frame parts spaced apart from each other in a first direction and extending in a second direction intersecting the first direction. The tension member includes a tension part extending between the pair of main frame parts. The cover defines a bag and accommodates the pair of main frame parts and the tension member in the bag. The pad encloses the pair of main frame parts and the tension member, the pad being made of a material which has had fluidity and been injected in the bag through a specific portion of the cover that is away from the tension part and faces the tension part in a third direction intersecting the first direction and the second direction.

A method for manufacturing a headrest according to another aspect of the present invention is a method for a headrest to be attached to a vehicle seat, and includes the following steps:

(i) a step of fixedly attaching a tension member to at least one of a pair of main frame parts constituting a frame, the pair of main frame parts being spaced apart from each other in a first direction and extending in a second direction intersecting the first direction, the tension member including a tension part to extend between the pair of main frame parts;

(ii) a step of setting, in a mold, a cover defining a bag and accommodating the pair of main frame parts and the tension member in the bag; and (iii) a step of forming a pad in such a manner as to enclose the pair of main frame parts and the tension member by injecting a material having fluidity into the bag through a specific portion of the cover that is away from the tension member and faces the tension member in a third direction intersecting the first direction and the second direction.

DESCRIPTION OF EMBODIMENTS

Figure 1:
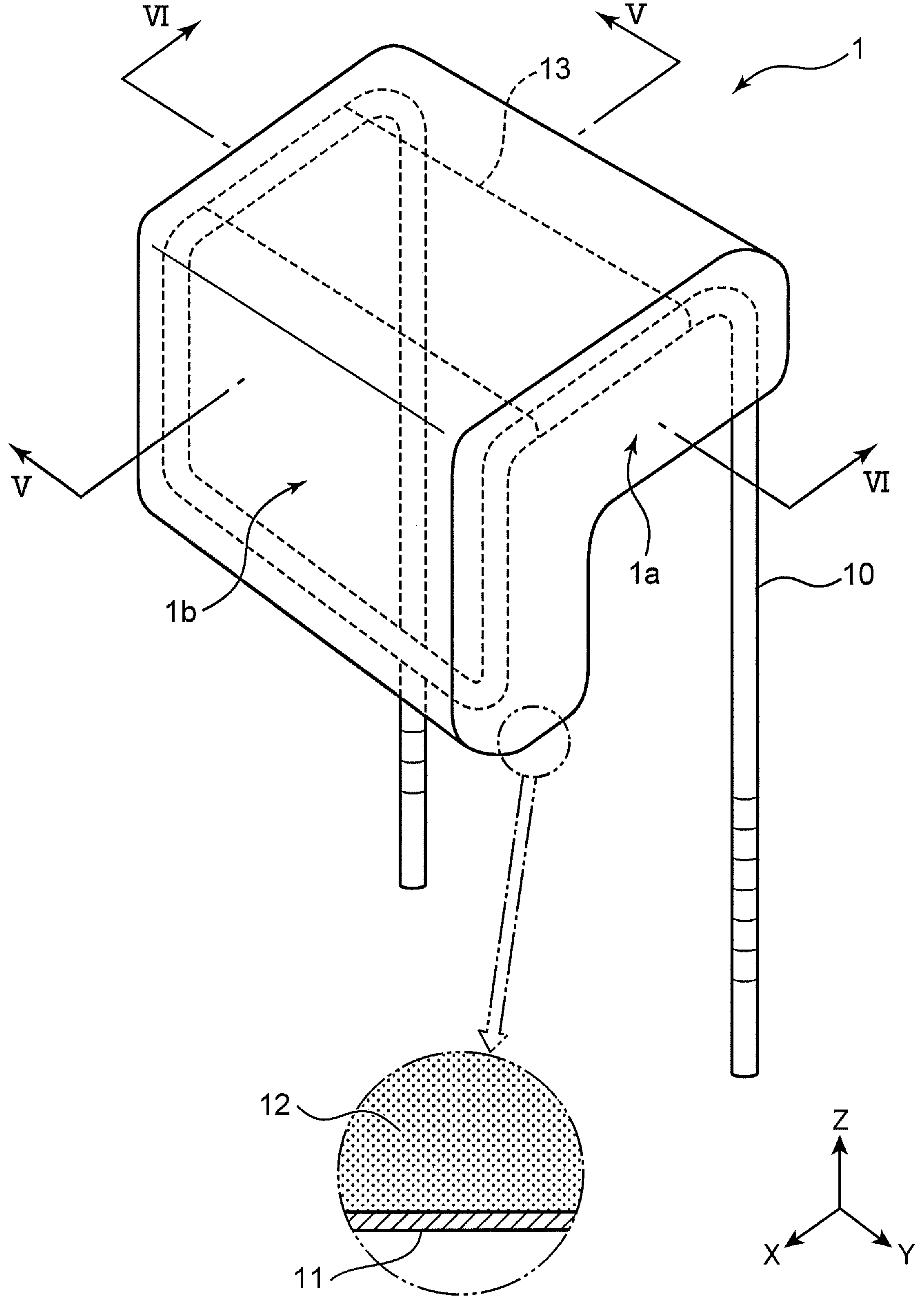
FIG. 1 is a perspective view of an external configuration of a headrest according to an embodiment of the present invention.

Hereinafter, an embodiment of the present invention will be described with reference to the accompanying drawings. It should be noted that the following embodiment illustrates one specific example of the present invention, and the present invention is not delimited to the embodiment except its essential configuration.

In the drawings, the X-direction corresponds to the "second direction", the Y-direction corresponds to the "first direction", and the Z-direction corresponds to the "third direction".

1. Configuration of a Headrest 1

A configuration of a headrest 1 according to the embodiment of the present invention will be described with reference to FIG. 1 and FIG. 2. The headrest 1 is to be attached to a vehicle seat.

As shown in FIG. 1, the headrest 1 includes a frame 10, a cover 11, and a pad 12. The pad 12 is made of resin foam, e.g., urethane foam, and encloses a part of the frame 10. The cover 11 covers a surface of the pad 12.

The headrest 1 according to the embodiment has such a so-called saddle shape that a rear part 1*a* to be located at an upper portion of the seat has a smaller thickness than a front part 1*b* to extend along a front portion of the seat in the Z-direction of the pad 12 in attachment to the vehicle seat.

Figure 2:
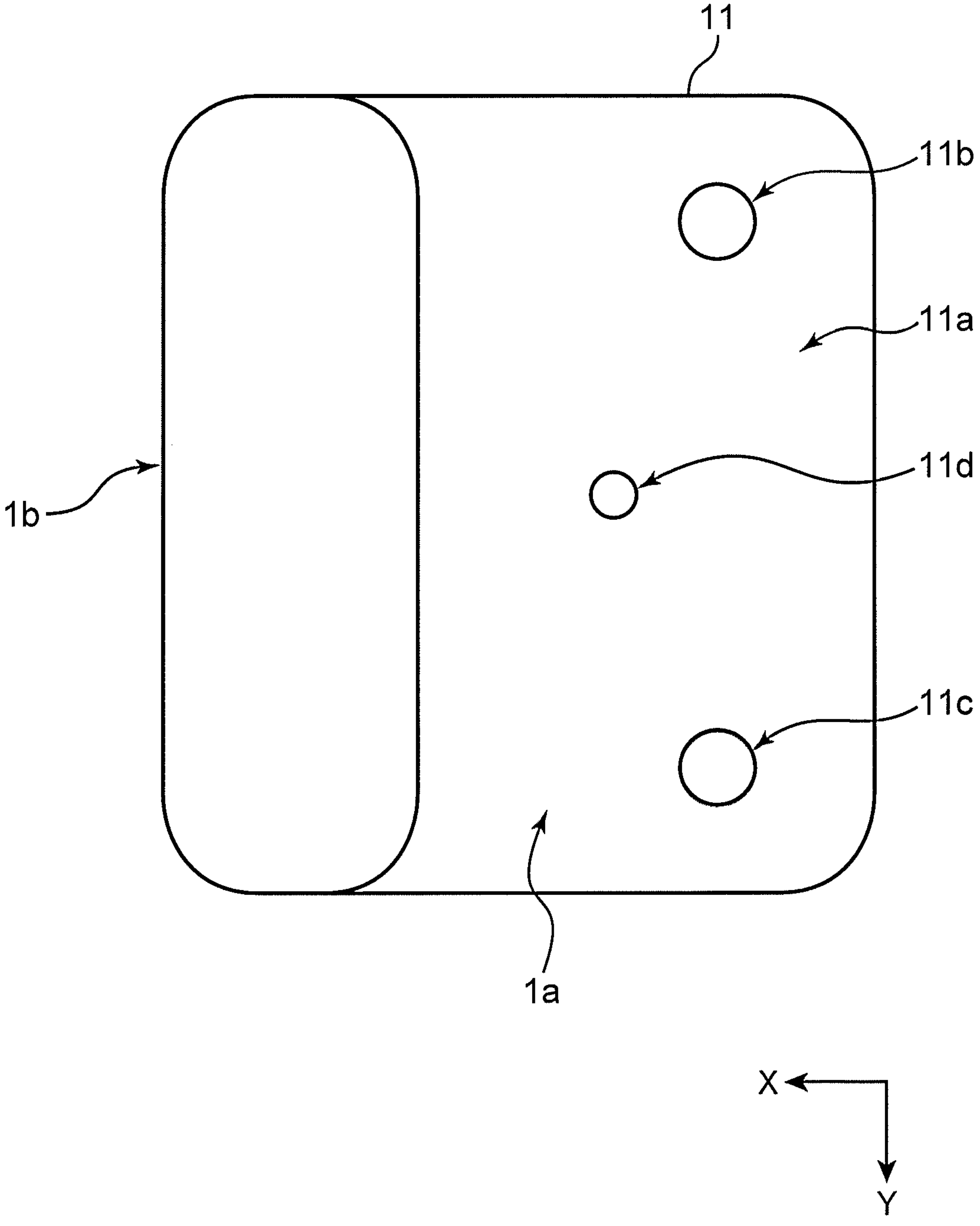
FIG. 2 is a bottom view of the headrest viewed from below.

As shown in FIG. 2, in the bottom view of the headrest 1, the cover 11 has a lower surface 11*a* provided with three holes 11*b* to 11*d*. The three holes 11*b* to 11*d* are located in the rear part 1*a* of the headrest 1. Each of the hole 11*b* and the hole 11*c* among the three holes 11*b* to 11*d* serves as a hole (frame insertion hole) for allowing a leg of the frame 10 to extend therethrough. The hole 11*d* is a hole (injection portion) for injecting a material for forming the pad 12 into the cover 11.

As shown FIG. 2, the frame insertion hole 11*b* and the frame insertion hole 11*c* are located in a rearward portion of the rear part 1*a* of the headrest 1 in the X-direction, and spaced apart from each other in a Y-direction. The material injection hole 11*d* is located in front of the frame insertion holes 11*b*, 11*c* in the X-direction and in the middle between frame insertion hole 11*b* and the frame insertion hole 11*c* in the rear part 1*a* of the headrest 1 in the Y-direction.

2. Configuration of Each of the Frame 10 and a Tension Tape 13

A configuration of each of the frame 10 and a tension tape 13 will be described with reference to FIG. 3 and FIG. 4.

Figure 3:
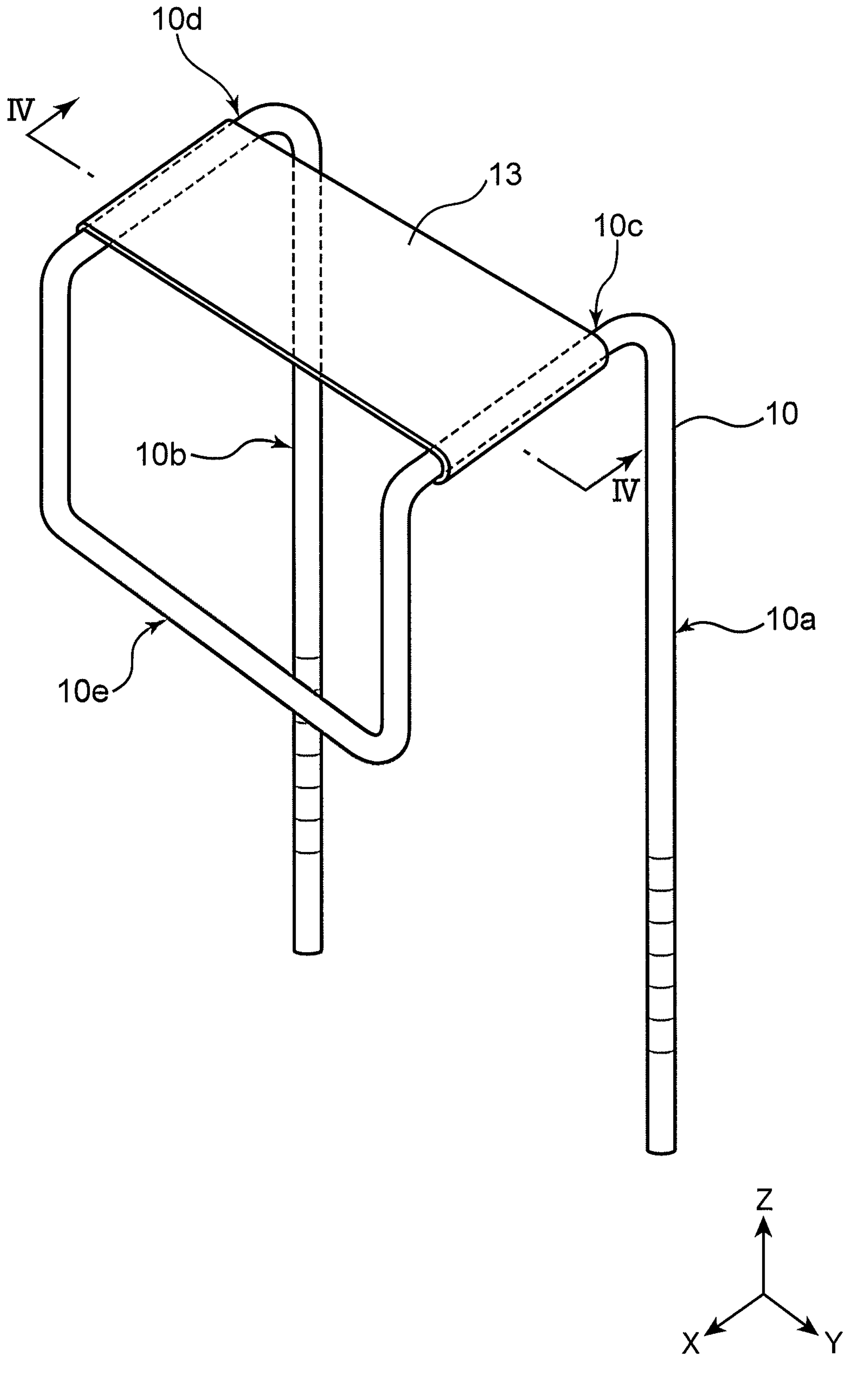
FIG. 3 is a perspective view of a frame and a tension tape in the headrest.

As shown in FIG. 3, the frame 10 includes a pair of legs 10*a*, 10*b*, a pair of main parts or main frame parts 10*c*, 10*d*, and a connection part 10*e* integrally formed. The frame 10 is made of a metal pipe. The pair of legs 10*a*, 10*b* extend in the Z-direction and are spaced apart from each other in the Y-direction.

The main part 10*c* is continuous to the leg 10*a* via an upper end of the leg 10*a* in the Z-direction and extends in the X-direction. The main part 10*d* is continuous to the leg 10*b* via an upper end of the leg 10*b* in the Z-direction, extends in the X-direction, and are spaced apart from the main part 10*c* in the Y-direction.

The connection part 10*e* bends in a U-shape in a front view in the X-direction. The connection part 10*e* has one end continuous to a front end of the main part 10*c*, and the connection part 10*e* has another end continuous to a front end of the main part 10*d*. The connection part 10*e* extends downward in the Z-direction from its portions respectively continuous to the main parts 10*c*, 10*d*.

For instance, the tension tape or tension member 13 has a base made of non-woven fabric and is a member (non-woven fabric base adhesive tape) in the shape of a strip (ribbon) having a main face (lower main face in the Z-direction) having an adhesive surface. As shown in FIG. 3, the tension tape 13 extends between the main part 10*c* and the main part 10*d* of the frame 10.

A tape having no release layer including, such as a silicone resin, on a surface (a main face opposite to the face having the adhesive surface) of the base is adopted as the tension tape 13. This aims at keeping the tension tape 13 from repelling a pad forming material at forming of the pad 12 to be described later.

Figure 4:
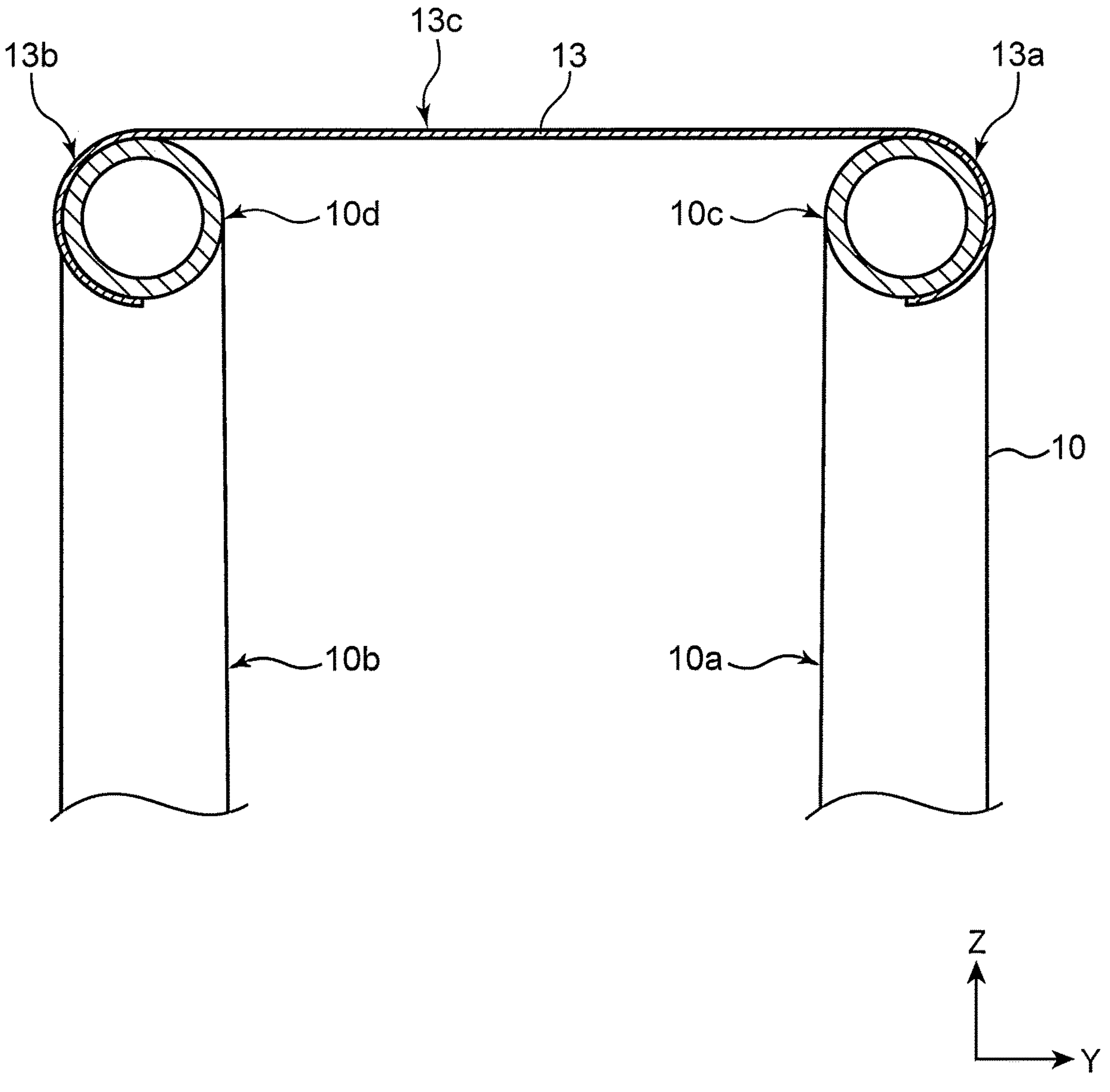
FIG. 4 is a cross-sectional view taken along the line IV-IV in FIG. 3

As shown in FIG. 4, the tension tape 13 includes sticky parts or fixed parts 13*a*, 13*b* and a tension part 13*c*. The sticky part 13*a* is adhered to an outer surface of the main part 10*c* by the adhesive surface. The sticky part 13*b* is adhered to an outer surface of the main part 10*d* by the adhesive surface. The tension part 13*c* is continuous to the sticky part 13*a* and the sticky part 13*b* to extend between the main part 10*c* and the main part 10*d*.

3. Positional Relation Between the Material Injection Hole 11*d* of the Cover 11 and the Tension Tape 13

The positional relation between the material injection hole 11*d* of the cover 11 and the tension tape 13 will be described with reference to FIG. 5 and FIG. 6.

Figure 5:
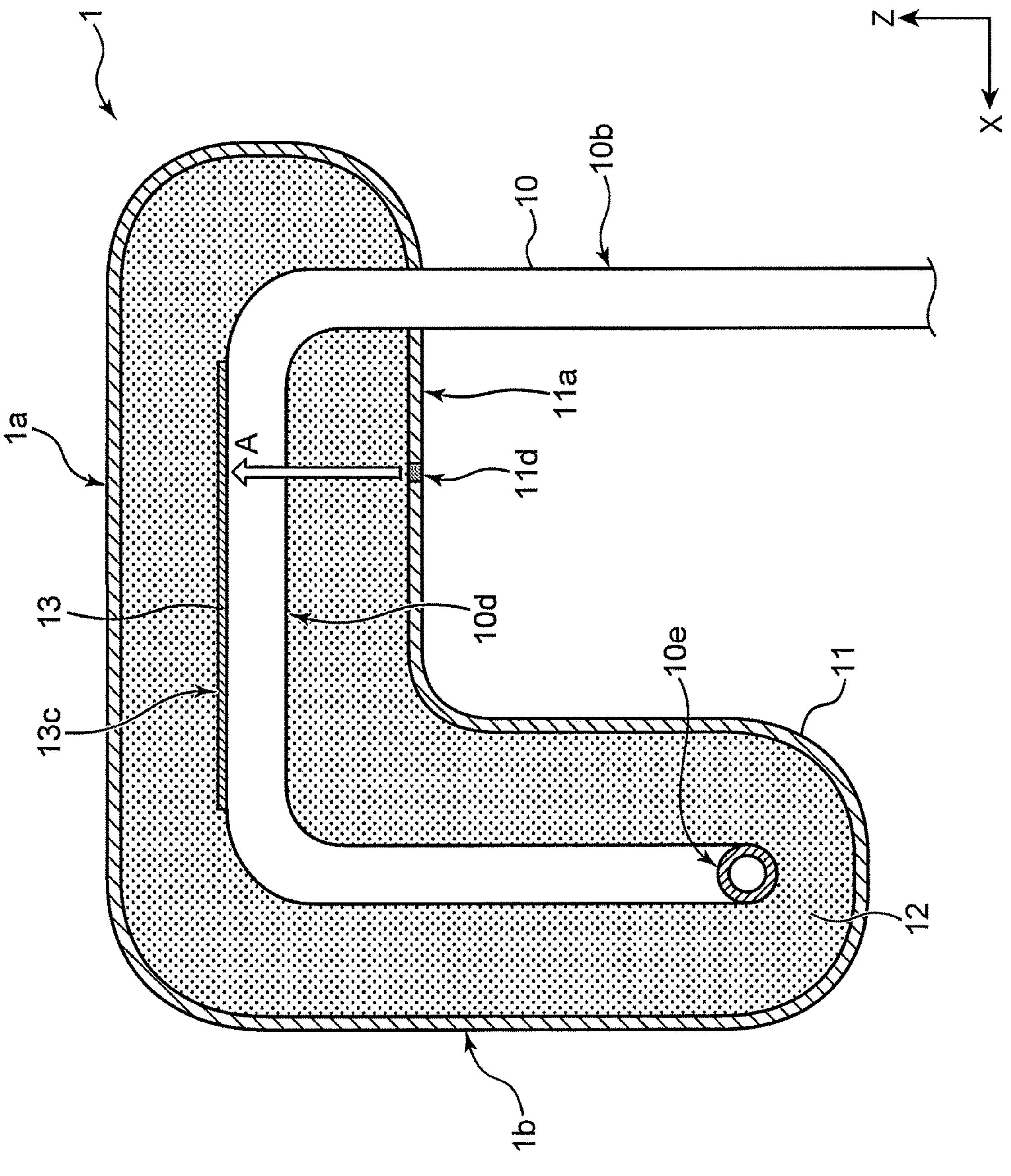
FIG. 5 is a cross-sectional view taken along the line V-V in FIG. 1

As shown in FIG. 5, the tension part 13*c* of the tension tape 13 extends in the X-direction over a position that faces the material injection hole 11*d* (an injection portion for the material) formed in the lower surface 11*a* of the cover 11 in the Z-direction as denoted by the arrow A. In the embodiment, the tension part 13*c* extends over a substantially whole longitudinal region of each of the main parts 10*c*, 10*d* in the X-direction (FIG. 5 omits illustration of the main part 10*c*).

The material injection hole 11*d* of the cover 11 and the tension part 13*c* of the tension tape 13 are away from each other at a distance therebetween. The distance between the material injection hole 11*d* and the tension part 13*c* in the Z-direction is longer than an insertion depth of the nozzle for injection of the material at the forming of the pad 12. In other words, the distance is set in such a manner as to keep a distal end of the nozzle inserted through the material injection hole 11*d* from reaching the tension part 13*c* at the forming of the pad 12. For instance, in insertion of the nozzle to reach X mm from the material injection hole 11*d*, the distance between the material injection hole 11*d* and the tension part 13*c* in the Z-direction is set to (X+$\alpha$) mm. In this case, the parameter "$\alpha$" is defined in consideration of the insertion depth of the nozzle and a manufacture variation in each part of the headrest 1 at the time of manufacturing the same. For example, in a case of provisional definition of the depth of the nozzle as 32 to 33 mm, the distance between the material injection hole 11*d* and the tension part 13*c* in the Z-direction is set to 35 to 40 mm or longer.

Figure 6:
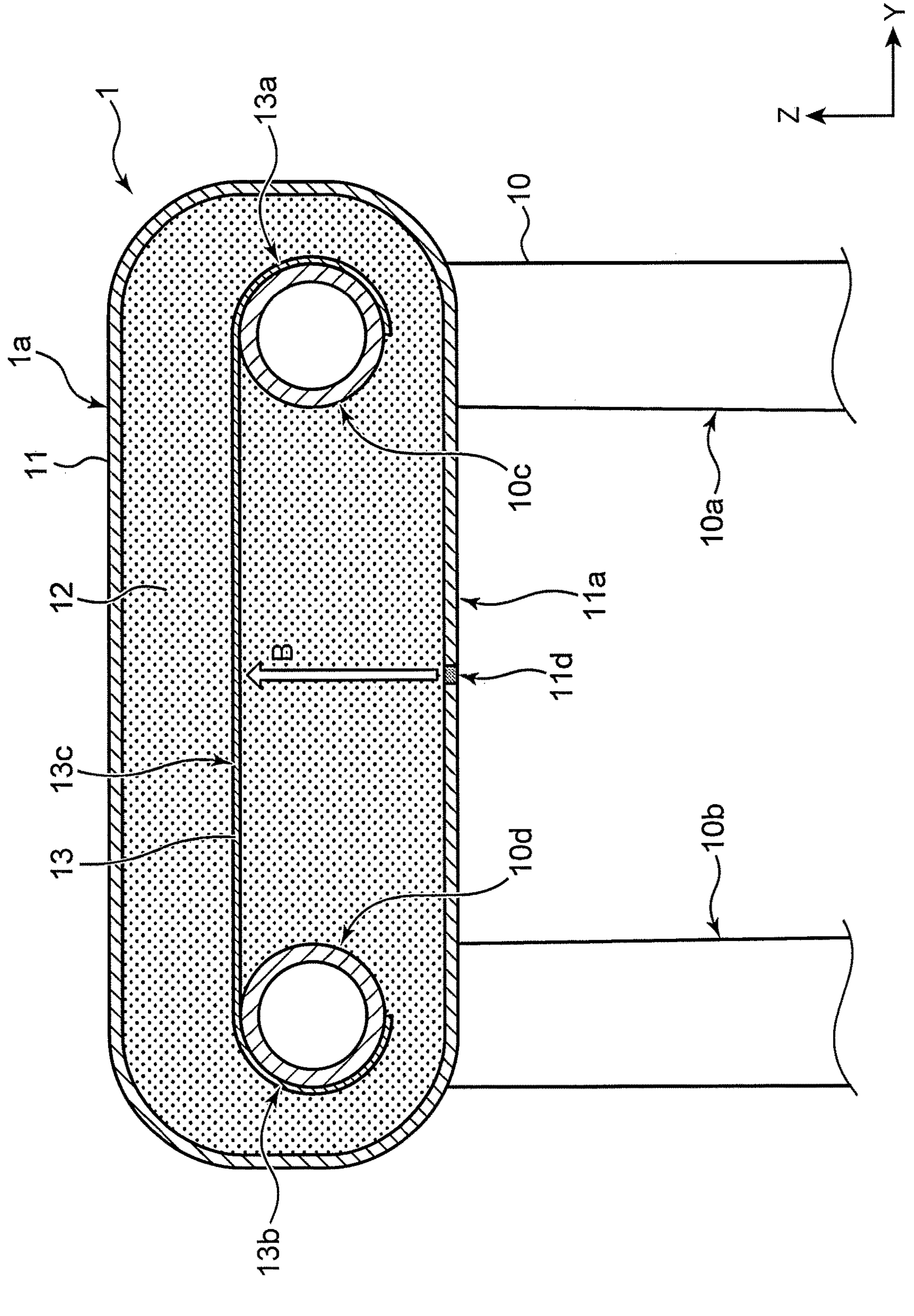
FIG. 6 is a cross-sectional view taken along the line VI-VI in FIG. 1

As shown in FIG. 6, the tension part 13*c* of the tension tape 13 extends between the main part 10*c* and the main part 10*d* of the frame 10 in the Y-direction. The lower surface 11*a* of the cover 11 has the material injection hole 11*d* in an intermediate portion between the main part 10*c* and the main part 10*d* of the frame 10 in the Y-direction. It is seen from this perspective that the tension part 13*c* of the tension tape 13 extends in the Y-direction over a position that faces the material injection hole 11*d* formed in the cover 11 in the Z-direction as denoted by the arrow B.

4. Method for Manufacturing the Headrest 1

A method for manufacturing the headrest 1 will be described with reference to FIG. 3, FIG. 4, and FIG. 7.

Frame Forming Step

A metal pipe is bent to form the frame 10 including the legs 10*a*, 10*b*, the main parts 10*c*, 10*d*, and the connection part 10*e*, as shown in FIG. 3.

Tension Tape Extending Step

Next, as shown in FIG. 4, a non-woven fabric base adhesive tape or tension tape 13 is adhered to the main parts 10*c*, 10*d* of the frame 10. This completes fixation of the tension tape 13 including the tension part 13*c* extending between the main part 10*c* and the main part 10*d*.

Cover Covering Step

Figure 7:
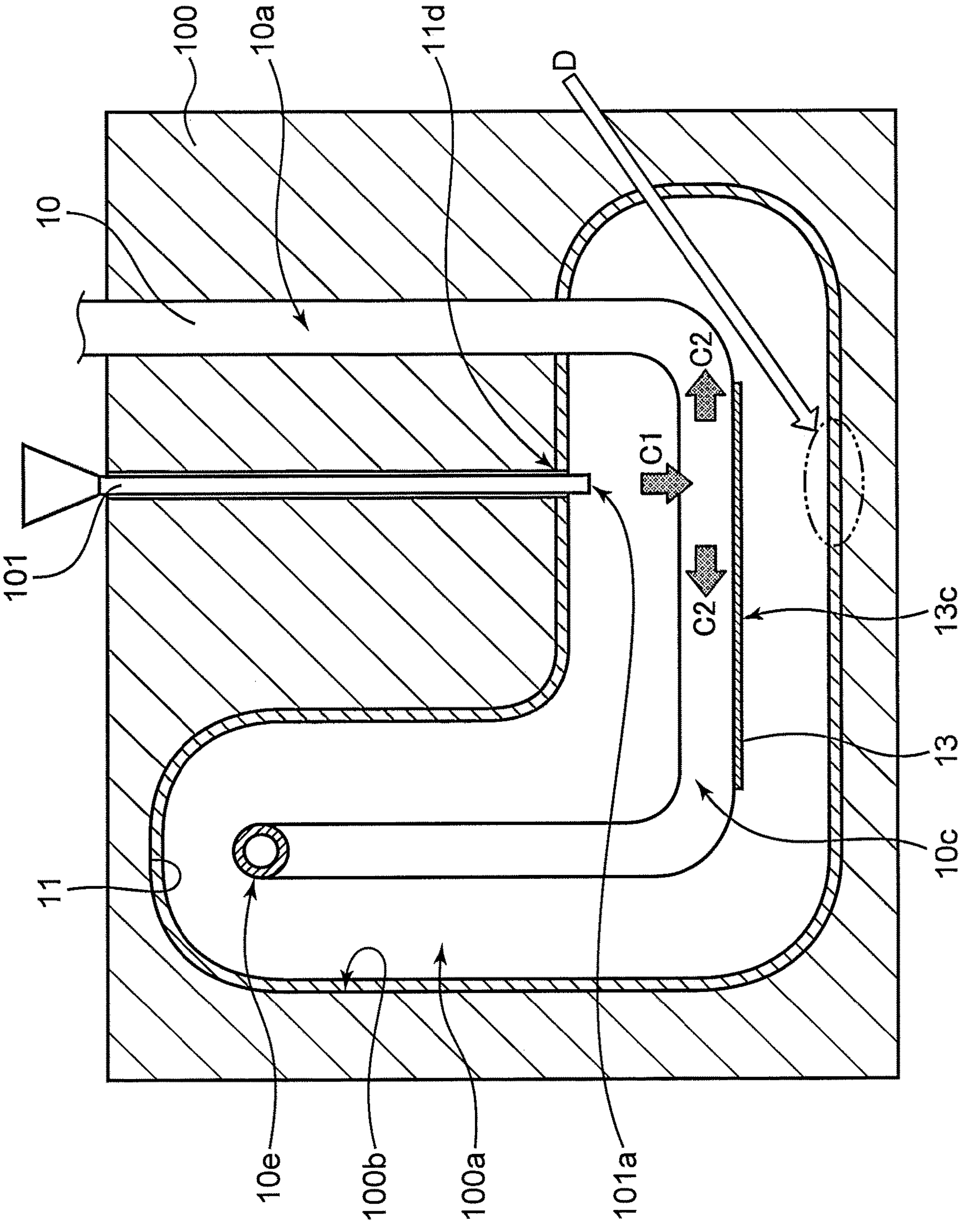
FIG. 7 is a view showing a material injection step in manufacturing the headrest in a cross section.

As shown in FIG. 7, the cover 11 defining a bag is provided to cover and surround the main parts 10*c*, 10*d* and the connection part 10*e* of the frame 10. Covering the frame 10 with the cover 11 defining the bag in this manner makes the material injection hole 11*d* formed in the cover 11 and a part of the tension part 13*c* of the tension tape 13 face each other.

The frame 10, the cover 11, and the tape 13 for prevention of excessive density are arranged in such a manner that the distance between the material injection hole 11*d* and the tension part 13*c* in the Z-direction reaches 35 to 40 mm or longer in the state where the cover 11 covers the frame 10.

The frame 10, the cover 11, and the tension tape 13 are placed in an inner space (cavity) 100*a* of a mold 100.

Although not illustrated in detail, the mold 100 includes a plurality of (e.g., two) mold parts in combination.

Material Filling Step

A nozzle 101 is inserted into the mold 100 to fill the inner space 100*a* (inside the cover 11) with a pad forming material (e.g., urethane) from a distal end opening 101*a* (arrow C1). The nozzle 101 is inserted inward through the material injection hole 11*d* by, for example, around 32 to 33 mm.

The pad forming material having flowed out through distal end opening 101*a* of the nozzle 101 advances toward a portion that is denoted by the arrow D and faces the material injection hole 11*d*, but the tension part 13*c* of the tension tape 13 provided midway distributes the flow of the material (arrow C2). This decreases the injection pressure of the material and suppresses concentration of the material into the portion of the cover 11 denoted by the arrow D, resulting in preventing a hard spot from occurring.

The injection of the pad forming material is continued until the amount of the material reaches a predetermined capacity, i.e., an inner capacity of the cover 11. In this manner, the cover 11 comes into close contact with an inner surface 100*b* of the mold 100 without a gap therebetween.

Finally, ejection of the headrest 1 from the mold 100 completes the manufacturing of the same.

5. Effects

In the headrest 1 and the method for manufacturing the headrest according to the embodiment, the tension tape 13 extends between the main part 10*c* and the main part 10*d* of the frame 10. The tension tape 13 has such a region where the tension part 13*c* extends between the main part 10*c* and the main part 10*d* as to include a position that is away from and faces the material injection hole 11*d* of the cover 11. The headrest 1 and the method for manufacturing the headrest 1 thus avoids a risk of breakage and detachment of the tension tape 13 by a distal end of a nozzle inserted through the material injection hole 11*d* at injection of a material for forming the pad 12. Consequently, regarding the headrest 1 and the method for manufacturing the headrest 1, the tension part 13*c* of the tension tape 13 keeps the pad forming material from reaching a part of the cover 11 under a highly kept injection pressure at the injection of the material, and prevents a hard spot from occurring at a specific portion in the cover 11.

Each of the technologies in Patent Literatures 1 to 4 including the mesh member fixed around the material injection hole in the cover has a possibility that the pad forming material hits the mesh member at injection of the material, and the portion around the material injection hole may be pulled inward in the bag together with the mesh member under an injection pressure. In this case, the finished headrest may have a recess at the material injection hole and the portion therearound, and thus have a poor appearance quality.

By contrast, the headrest 1 and the method for manufacturing the headrest 1 according to the embodiment in which the tension tape 13 is not fixedly attached to the cover 11 but is fixedly attached to the frame 10 having higher stiffness than the cover 11 avoid the problem of the poor appearance quality seen in the technologies disclosed in Patent Literatures 1 to 4, even under the injection pressure of the pad forming material applied to the tension tape 13 at injection of the material.

In the headrest 1 and the method for manufacturing the headrest 1 according to the embodiment, the fixed parts 13*a*, 13*b* of the tension tape 13 are fixedly attached to the main part 10c and the main part 10d respectively. The headrest 1 and the method for manufacturing the headrest 1 thus achieve suppression of detachment of the tension tape 13 from the frame 10 and displacement thereof from the main parts 10c, 10d even under the injection pressure of the pad forming material at the injection of the material. The headrest 1 and the method for manufacturing the headrest 1 consequently attain reliable suppression of an occurrence of a hard spot in the cover 11.

The headrest 1 and the method for manufacturing the headrest 1 according to the embodiment adopting, as the tension member, the tension tape (in the shape of a strip) 13 having a main face having an adhesive surface require no cumbersome operation in fixedly attaching the tension tape 13 to the main parts 10c, 10d of the frame 10, and thus achieve a decrease in the number of manufacturing steps. This results in a success in a manufacturing cost reduction.

The headrest 1 and the method for manufacturing the headrest 1 according to the embodiment make a headrest have such a structure in a so-called saddle shape that the thickness of the rear part 1a in the Z-direction is smaller than the thickness of the front part 1b in the Z-direction. The structure allows the tension tape 13 to distribute the flow of the injected pad forming material and the tension tape 13 to decrease the injection pressure of the material, and thus keeps the material from reaching a part of the cover 11 under the highly kept injection pressure and suppresses an occurrence of a hard spot.

Conclusively, the headrest 1 and the method for manufacturing the headrest according to the embodiment can contribute to manufacturing without the necessity of a cumbersome operation, and to suppression of an occurrence of a hard spot.

First Modification

Figure 8:
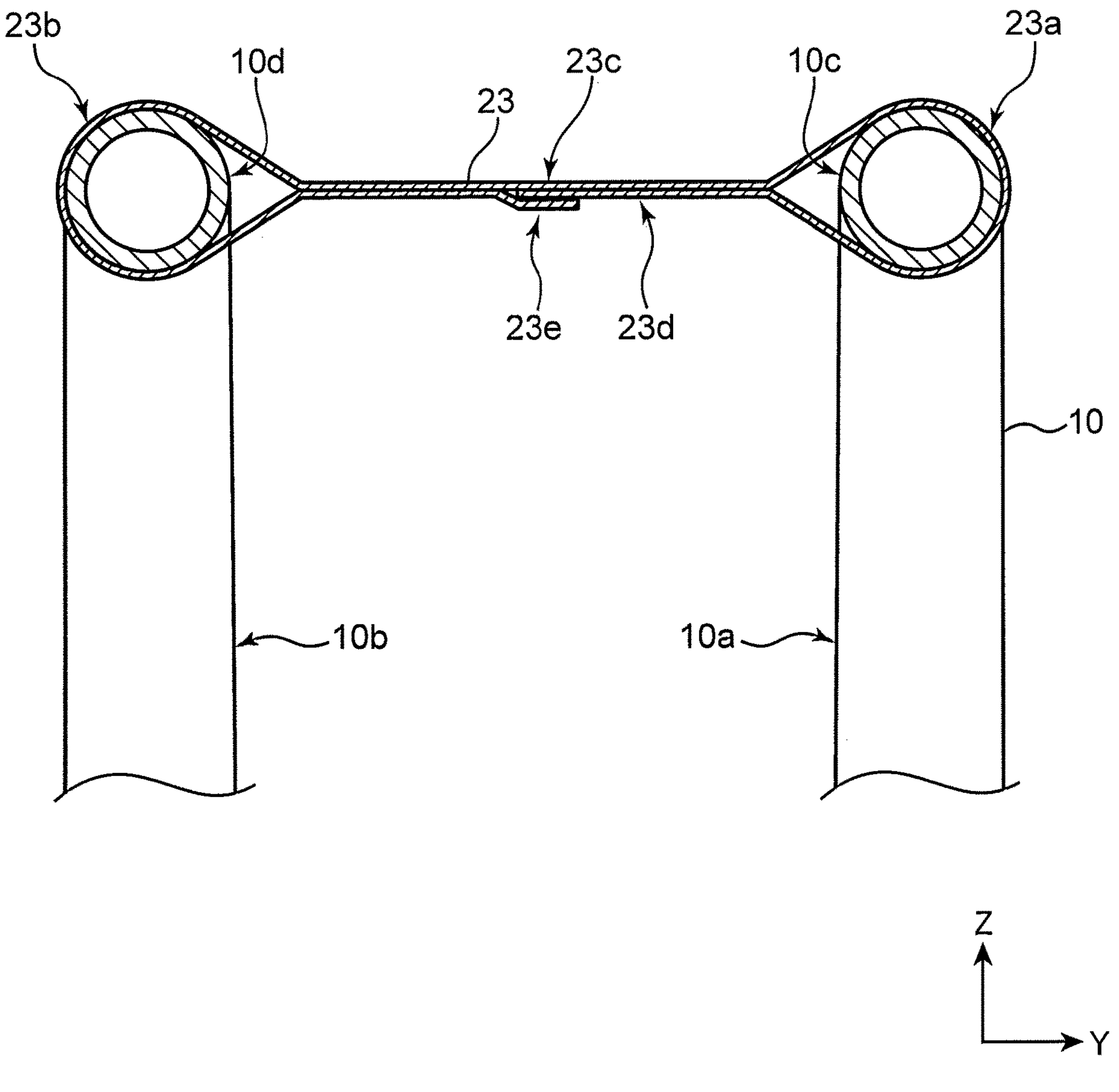
FIG. 8 is a front view of a frame and a tension tape in a headrest according to a first modification.

A headrest according to a first modification will be described with reference to FIG. 8. FIG. 8 shows only a frame 10 and a tension tape (tension member) 23 extracted from a configuration of the headrest. In FIG. 8, each member given the same reference numeral or sign as that in the embodiment has the same configuration as a corresponding member in the embodiment.

As shown in FIG. 8, the tension tape 23 extends between a main part 10c and a main part 10d of the frame 10 in the headrest according to the modification. The tension tape 23 has a main face having an adhesive surface, e.g., a non-woven fabric base adhesive tape, in the same manner as the tension tape 13 in the embodiment.

The tension tape 23 is wound around the main part 10c and the main part 10d at least one turn. The tension tape 23 is adhered to the main part 10c and the main part 10d by the adhesive surface on its regions, i.e., attachment parts 23a, 23b, to come into contact with the main parts respectively. In the headrest according to the modification, each of the sticking parts 23a, 23b of the tension tape 23 corresponds to the "fixed part".

The tension tape 23 further has tension parts 23c, 23d in two layers between the attachment part 23a and the attachment part 23b in the Y-direction. The tension parts 23c, 23d in two layers are adhered to each other by the adhesive surface. The tension parts 23c, 23d in two layers extend over a region including a position that faces a material injection hole (injection portion) 11d formed in a cover 11.

The lower tension part 23d of the tension parts 23c, 23d in two layers in the Z-direction includes an overlapping section 23e of one end and another end of the tension tape 23. The ends are adhered to each other by the adhesive surface in the overlapping section 23e.

The headrest including the tension tape 23 having this configuration is manufactured, like the headrest 1 according to the embodiment, in such a manner that a flow of a pad forming material that had been injected through a material injection hole 11d hits the tension part 23d of the tension tape 23 to be distributed. Consequently, the headrest according to the modification also attains suppression of an occurrence a hard spot in the cover 11.

The headrest according to the modification adopting the configuration of the tension tape 23 wound around the main part 10c and the main part 10d one turn further reliably maintains a posture of each of the tension parts 23c, 23d extending between the main parts 10c, 10d. Adhesion of the tension parts 23c, 23d of the tension tape 23 to each other achieves further ensured suppression of detachment and displacement of the tension tape 23 from the main frame parts 10c, 10d at the injection of the material.

The modification adopts the configuration of the tension tape 23 wound around the main part 10c and the main part 10d one turn, but may adopt a configuration of a tape wound therearound two or more turns.

Second Modification

Figure 9:
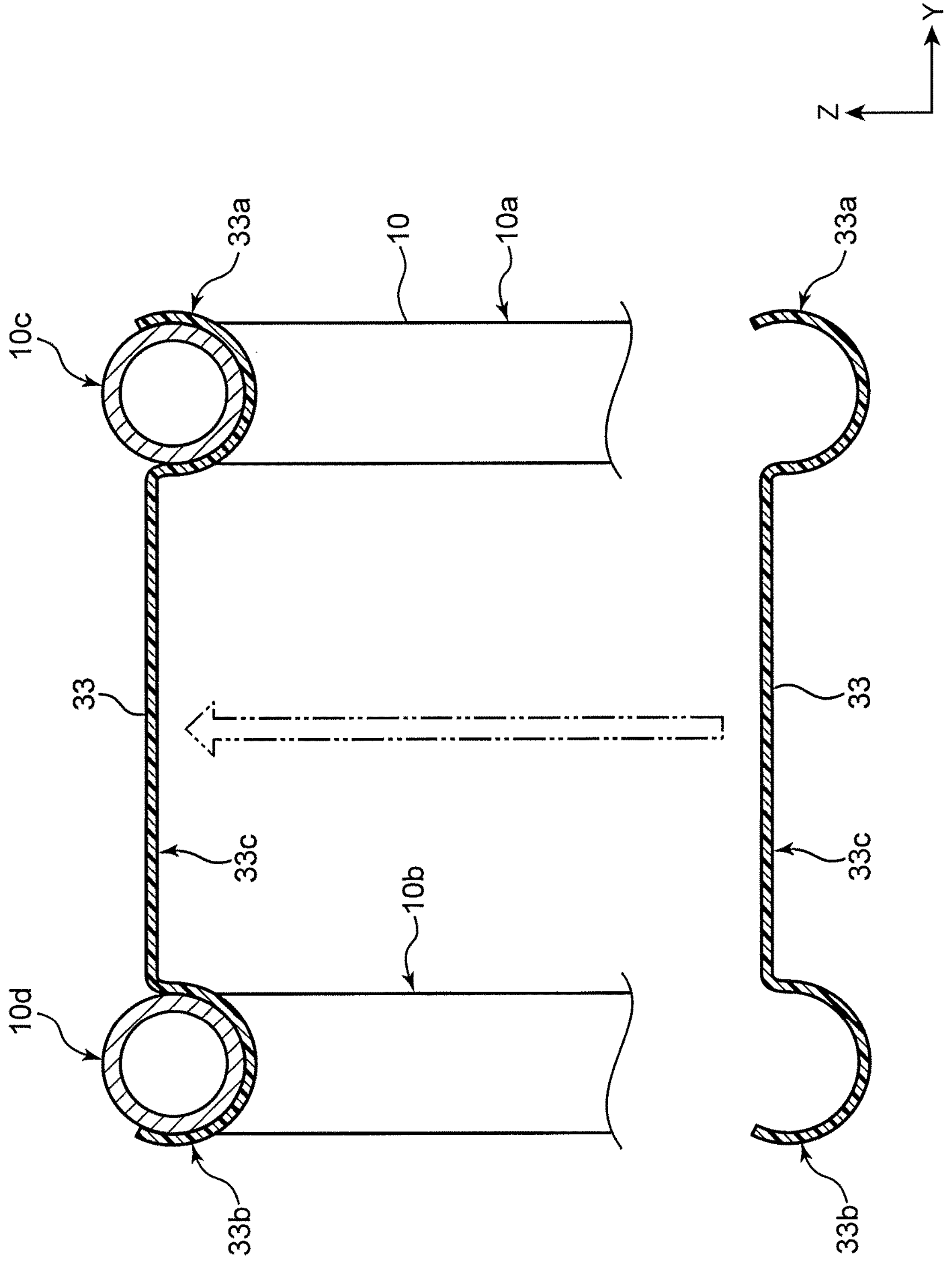
FIG. 9 is a front view of a frame and a molded tension member in a headrest according to a second modification.

A headrest according to a second modification will be described with reference to FIG. 9. FIG. 9 also shows the same configuration of the headrest as the configuration in the embodiment except for a molded tension member 33.

The headrest according to this modification adopts, as a tension member, a molded tension member (tension member) 33 formed through resin molding in place of the tension tapes (each in the shape of a strip) 13, 23 in the embodiment and the first modification. The molded tension member 33 is made of a resin material, e.g., polystyrene, an ABS resin, or other resin, which does not repel a pad forming material.

As shown in FIG. 9, the molded tension member 33 includes engagement parts 33a, 33b and a tension part 33c integrally formed. The molded tension member 33 has a length to be the same as or substantially slightly shorter than a length of each of main parts 10c, 10d of a frame 10 in a front-rear direction (X-direction) of the paper of FIG. 9. Here, the molded tension member 33 is defined to have such a length as to extend over a range including at least a position that faces a material injection hole 11d (injection portion) formed in a cover 11.

Each of the engagement part (fixed part) 33a and the engagement part (fixed part) 33b has a C-shaped cross section with an opening facing upward in the Z-direction. Each of the engagement part 33a and the engagement part 33b in engagement with the main parts 10c, 10d of the frame 10 has the cross section with the opening facing upward at an angle of less than 180° to avoid disengagement from the main parts 10c, 10d.

The tension part 33c has a substantially planner plate shape. However, the tension part 33c may have another shape, such as a protrusive plate shape with upward or downward protrusions in the Z-direction or a wavy plate shape, in place of the planner plate shape.

The engagement parts 33a 33b are respectively engaged with the main parts 10c, 10d to attach the molded tension member 33 having the shape shown in FIG. 9 to the frame 10. The engagement of the engagement parts 33a, 33b with the main parts 10c, 10d is preferably performed from below in the Z-direction as shown in FIG. 9 in terms of unlikelihood of disengagement at injection of a pad forming material, but may be performed from above in the Z-direction depending on an engagement strength.

The headrest including the molded tension member 33 having the above-described configuration is manufactured, like the headrest 1 according to the embodiment and the headrest according to the first modification, in such a manner that a flow of the pad forming material having been injected through a material injection hole 11*d* hits the tension part 33*c* of the molded tension member 33 to be distributed. Consequently, the headrest according to the modification also attains suppression of an occurrence a hard spot in the cover 11.

Other Modifications

Although each of the embodiment and the first modification adopts, as the tension member, an adhesion tape (the tension tape 13, 23) having a main face having an adhesive surface, the present invention may adopt a strip-shaped member (ribbon-shaped member) having no adhesive surface. In this case, an adhesive is applicable to fixation to the main parts 10*c*, 10*d* of the frame 10, and joining of strip-shaped members to each other. Alternatively, for example, a stapler is adoptable to join ends of a strip-shaped member together as shown in FIG. 8.

Although the embodiment adopts the configuration in which the tension part 13*c* of the tension tape 13 extends on contact with upper portions of the main parts 10*c*, 10*d* in the Z-direction as shown in FIG. 4 and other drawings, the present invention may adopt a configuration in which the tension part extends on contact with lower portions of the main parts 10*c*, 10*d* in the Z-direction.

Although each of the embodiment, and the first and second modifications adopts a pipe member as a constituent member of the frame 10, the present invention may adopt a solid metal rod or other member.

Although each of the embodiment, and the first and second modification does not particularly mention a material for the cover 11, the present invention may adopt various kinds of materials therefor, e.g., vinyl chloride, fabric, synthetic leather or artificial leather, and genuine leather.

Although each of the embodiment, and the first and second modification does not particularly mention a dimension about a width of each of the tension tapes 13, 23 in detail, the width may be appropriately set in consideration of a distance between each of the main parts 10*c*, 10*d* of the frame 10 and the material injection hole 11*d* of the cover 11 in the headrest 1, for example, may be set to about 30 mm to 50 mm. The thickness of each of the tension tapes 13, 23 may be also appropriately set in consideration of a relation with an injection pressure of a pad forming material, for example, may be satisfactorily set to around 0.1 mm or longer, and may be set to around 1 mm or shorter.

Regarding the tension tape, a narrow tape or a string may be wound around the main part 10*c* and the main part 10*d* a plurality of turns in a spiral manner to extend over a region including a position that faces the material injection hole 11*d*.

Although each of the embodiment and the first modification adopts the non-woven fabric base adhesive tape as each of the tension tapes 13, 23, the present invention may adopt an adhesive tape including a base made of Japanese traditional paper, fabric, pulp, or other material. However, even in this case, use of a tape having no release layer including silicone resin on a surface of the base (that is, a tape having an adhesive surface that had been covered with a sheet of release paper before adhesion to the frame 10) is important to keep the tension tape from repelling a pad forming material at injection of the material. This is because repelling of the material by the release layer of the tape may lead to an occurrence of a cavity in a portion around the tape in a finished product.

Although each of the embodiment, and the first and second modifications adopts, as an example, a configuration that even the finished headrest 1 maintains the material injection hole 11*d* having a circular shape in the lower surface 11*a* of the cover 11, the present invention may adopt closing the material injection hole after forming the pad. In a case of closing the material injection hole after forming the pad in this manner, a trace of the closed hole is defined as the "injection portion".

Although the embodiment provides the material injection hole 11*d* in front of the frame insertion holes 11*b*, 11*c* in the X-direction as shown in FIG. 2, the present invention may provide the material injection hole 11*d* on a straight line connecting the frame insertion hole 11*b* and the frame insertion hole 11*d* to each other. Providing this configuration with the tension part of the tension member between the main part 10*c* and the main part 10*d* achieves the same effect as the effect in each of the embodiment, and the first and second modifications.

Although the embodiment and the first modification respectively adopt the associated tension tapes 13, 23 adhered to the main part 10*c* and the main part 10*d*, and second modification adopts the molded tension member 33 engaged with the main part 10*c* and the main part 10*d*, the present invention may adopt a metal member joined to the main part 10*c* and the main part 10*d* by welding or plating. This configuration also exerts the same effect as the effect of the configuration in each of the embodiment, and the first and second modifications.

CONCLUSION

A headrest for a vehicle seat according to one aspect of the present invention includes a frame, a tension member, a cover, and a pad. The frame includes a pair of main frame parts spaced apart from each other in a first direction and extending in a second direction intersecting the first direction. The tension member includes a tension part extending between the pair of main frame parts. The cover defines a bag and accommodates the pair of main frame parts and the tension member in the bag. The pad encloses the pair of main frame parts and the tension member, the pad being made of a material which has had fluidity and been injected in the bag through a specific portion of the cover that is away from the tension part and faces the tension part in a third direction intersecting the first direction and the second direction.

The headrest according to this aspect includes the tension member extending between the pair of main frame parts. The tension member includes the tension part defined to extend over a position that is away from and faces a portion (injection portion) in the cover for injection of a pad forming material. The headrest according to the aspect thus avoids a risk of breakage of the tension member by a distal end of a nozzle inserted through the injection portion at the injection of the pad forming material in manufacturing of the headrest. Consequently, regarding the headrest according to the aspect, the tension member keeps the pad forming material from reaching a part of the cover under a highly kept injection pressure at the injection of the material, and prevents a hard spot from occurring in the cover.

Each of the technologies in Patent Literatures 1 to 4 including the mesh member fixed around the material injection hole in the cover has a possibility that the pad forming material hits the mesh member at injection of the material, and the portion around the material injection hole may be pulled inward in the bag together with the mesh member under an injection pressure. In this case, the finished headrest may have a recess at the material injection hole and the portion therearound, and thus have a poor appearance quality.

By contrast, the headrest according to the aspect in which the tension member extends between the main frame parts of the frame having high stiffness avoids breakage and detachment of the tension member even under the injection pressure of the pad forming material applied to the tension member at the injection of the material, and thus has no defect of a poor appearance quality unlike the technologies disclosed in Patent Literatures 1 to 4.

In the headrest for a vehicle seat according to the aspect, the tension member may include fixed parts respectively fixedly attached to the pair of main frame parts.

In the headrest having this configuration, the tension member includes the fixed parts respectively attached to the pair of main frame parts. The headrest having the configuration achieves suppression of detachment and displacement of the tension member from the frame regardless of the injection pressure of the pad forming material applied at the injection of the material. The headrest having the configuration thus attains more reliable suppression of an occurrence of a hard spot in the cover.

In the headrest for a vehicle seat according to the aspect, the tension member may be in the shape of a strip having a main face having an adhesive surface, and the fixed parts may fixedly attach the tension member to the pair of main frame parts by adhering the adhesive surface on the tension member to the pair of main frame parts.

The headrest having this configuration adopting, as the tension member, a strip-shaped member (ribbon-shaped member) having a main face having an adhesive surface requires no cumbersome operation in fixedly attaching the tension member to the frame, and thus achieves a decrease in the number of manufacturing steps.

In the headrest for a vehicle seat according to the aspect, the tension member may be wound around the pair of the main frame parts at least one turn with the adhesive surface facing inward.

The headrest having this configuration in which the strip-shaped member having a main face having an adhesive surface is wound around the pair of main frame parts at least one turn allows the strip-shaped member to have a higher fixing strength to the frame. The headrest having the configuration achieves further ensured suppression of detachment and displacement of the strip-shaped member or tension member from the frame in injection of the pad forming material, and attains further reliable suppression of an occurrence of a hard spot in the cover.

In the headrest for a vehicle seat according to the aspect, the tension member may have one end overlapping another portion of the tension member that is different from the one end in a winding direction, and adhered at the overlapping section by the adhesive surface.

The headrest having this configuration in which the overlapping part of the one end and another portion of the strip-shaped member is adhered by the adhesive surface achieves further ensured suppression of detachment and displacement of the strip-shaped member or tension member from the frame even under the injection pressure applied to the strip-shaped member at the injection of the pad forming material.

In the headrest for a vehicle seat according to the aspect, the frame may further include a connection part that has a U-shape extending downward in the third direction and connects respective ends of the pair of main frame parts to each other, the connection part of the frame may be accommodated in the bag and enclosed by the pad, and the head rest may have a saddle shape.

The headrest having this configuration has such a structure in a so-called saddle shape that the thickness of portions of the headrest for the pair of main frame parts in the third direction is smaller than the thickness of a portion for the connection part in the third direction. The structure allows the tension member to distribute the flow of the injected pad forming material and the tension member to decrease the injection pressure of the material, and thus keeps the material from reaching a part of the cover under the highly kept injection pressure and suppresses an occurrence of a hard spot.

A method for manufacturing a headrest according to another aspect of the present invention is a method for a headrest to be attached to a vehicle seat, and includes the following steps:

(i) a step of fixedly attaching a tension member to at least one of a pair of main frame parts constituting a frame, the pair of main frame parts being spaced apart from each other in a first direction and extending in a second direction intersecting the first direction, the tension member including a tension part to extend between the pair of main frame parts;

(ii) a step of setting, in a mold, a cover defining a bag and accommodating the pair of main frame parts and the tension member in the bag; and (iii) a step of forming a pad in such a manner as to enclose the pair of main frame parts and the tension member by injecting a material having fluidity into the bag through a specific portion of the cover that is away from the tension member and faces the tension member in a third direction intersecting the first direction and the second direction.

The method for manufacturing a headrest according to this aspect has no risk of breakage and detachment of the tension member by a distal end of a nozzle at insertion of the nozzle from a portion (injection portion) of the cover for injection of a pad forming material owing to the arrangement of the tension member that is away from the injection portion and faces the injection portion in a state where the bag (that is a member defined by the cover) and a part of the frame accommodated in the bag are set in a mold. Besides, in the step of forming the pad, a flow of the injected material hits the tension member to be distributed, and thus, the material is kept from reaching a part of the cover under a highly kept injection pressure and an occurrence of a hard spot is prevented.

As described above, each of the technologies in Patent Literatures 1 to 4 including the mesh member fixed around the material injection hole in the cover has a possibility that the injected material hits the mesh member and the portion around the material injection hole in the cover may be pulled inward in the bag together with the mesh member under an injection pressure. In this case, the finished headrest may have a recess at the material injection hole and the portion therearound, and thus have a poor appearance quality.

By contrast, the method for manufacturing a headrest according to the aspect includes fixedly attaching the tension member to the frame having high stiffness, and thus has no risk that the injection portion and the portion therearound are pulled inward in the bag even at the injection of pad forming material, and thus avoids the problem of the poor appearance quality described above.

In the method for manufacturing a headrest according to this aspect, the tension member may be in the shape of a strip having a main face having an adhesive surface, and, in the fixedly attaching step, the tension member may be fixedly attached to the pair of main frame parts by adhering the adhesive surface to the pair of main frame parts.

The method for manufacturing a headrest with the configuration adopting the strip-shaped member (ribbon-shaped member) having a main face having an adhesive surface as the tension member fixedly attached to the pair of main frame parts of the frame requires no cumbersome operation in fixedly attaching the tension member to the frame unlike another fixing method adopting, for example, sewing, and thus achieves a decrease in the number of manufacturing steps.

In the method for manufacturing the headrest according to the aspect, in the fixedly attaching step, the tension member may be wound around the pair of main frame parts at least one turn with the adhesive surface facing inward, and one end of the tension member in a winding direction may be overlapped on another portion of the tension member that is different from the one end, and may be adhered at the overlapping section by the adhesive surface.

The method for manufacturing a headrest with this configuration in which the strip-shaped member having a main face having an adhesive surface is wound around the pair of main frame parts at least one turn for fixed attachment allows the strip-shaped member to have a higher fixing strength to the frame.

The method for manufacturing a headrest with the configuration in which the overlapping part of the one end and another portion of the strip-shaped member or tension member is adhered by the adhesive surface achieves further ensured suppression of detachment and displacement of the strip-shaped member from the frame even under the injection pressure of the pad forming material applied to the strip-shaped member.

Conclusively, each configuration leads to achieved manufacturing without the necessity of a cumbersome operation, and attains suppression of an occurrence of a hard spot.

The invention claimed is:

1. A headrest for a vehicle seat, comprising:

a frame including a pair of main frame parts spaced apart from each other in a first direction and extending in a second direction intersecting the first direction;

a tension member including a tension part extending between the pair of main frame parts;

a cover defining a bag and accommodating the pair of main frame parts and the tension member in the bag; and a pad enclosing the pair of main frame parts and the tension member, the pad being made of a material which has had fluidity and been injected in the bag through a specific portion of the cover that is away from the tension part and faces the tension part in a third direction intersecting the first direction and the second direction, wherein the tension member is in the shape of a strip and the tension part extends over a substantially whole longitudinal region of each of the pair of main frame parts in the second direction, and the tension member includes a base made of at least one of Japanese traditional paper, a woven fabric, and a non-woven fabric.

2. The headrest for a vehicle seat according to claim 1, wherein the tension member includes fixed parts respectively fixedly attached to the pair of main frame parts.

3. The headrest for a vehicle seat according to claim 2, wherein the tension member in the shape of the strip has a main face having an adhesive surface, and the fixed parts fixedly attach the tension member to the pair of main frame parts by adhering the adhesive surface on the tension member to the pair of main frame parts.

4. The headrest for a vehicle seat according to claim 3, wherein the tension member is wound around the pair of the main frame parts at least one turn with the adhesive surface facing inward.

5. The headrest for a vehicle seat according to claim 4, wherein the tension member has one end overlapping another portion of the tension member that is different from the one end in a winding direction, and adhered at the overlapping section by the adhesive surface.

6. The headrest for a vehicle seat according to claim 1, wherein the frame further includes a connection part that has a U-shape extending downward in the third direction and connects respective ends of the pair of main frame parts to each other, the connection part of the frame is accommodated in the bag and enclosed by the pad, and the head rest has a saddle shape.

7. A method for manufacturing a headrest to be attached to a vehicle seat, the method comprising:

a step of fixedly attaching a tension member to at least one of a pair of main frame parts constituting a frame, the pair of main frame parts being spaced apart from each other in a first direction and extending in a second direction intersecting the first direction, the tension member including a tension part to extend between the pair of main frame parts;

a step of setting, in a mold, a cover defining a bag and accommodating the pair of main frame parts and the tension member in the bag;

a step of forming a pad in such a manner as to enclose the pair of main frame parts and the tension member by injecting a material having fluidity into the bag through a specific portion of the cover that is away from the tension member and faces the tension member in a third direction intersecting the first direction and the second direction, wherein the tension member is in the shape of a strip, and the tension member includes a base made of at least one of Japanese traditional paper, a woven fabric, and a non-woven fabric, and in the fixedly attaching step, the tension part is extended over a substantially whole longitudinal region of each of the pair of main frame parts in the second direction.

8. The method for manufacturing a headrest according to claim 7, wherein the tension member in the shape of the strip has a main face having an adhesive surface, and in the fixedly attaching step, the tension member is fixedly attached to the pair of main frame parts by adhering the adhesive surface to the pair of main frame parts.

9. The method for manufacturing a headrest according to claim 8, wherein, in the fixedly attaching step, the tension member is wound around the pair of main frame parts at least one turn with the adhesive surface facing inward, and one end of the tension member in a winding direction is overlapped on another portion of the tension member that is different from the one end, and is adhered at the overlapping section by the adhesive surface.

* * * * *